United States Patent
Draper et al.

(10) Patent No.: US 6,449,620 B1
(45) Date of Patent: Sep. 10, 2002

(54) METHOD AND APPARATUS FOR GENERATING INFORMATION PAGES USING SEMI-STRUCTURED DATA STORED IN A STRUCTURED MANNER

(75) Inventors: Denise L. Draper; David B. Christianson, both of Seattle; Konstantin L. Komissarchik, Brier, all of WA (US)

(73) Assignee: Nimble Technology, Inc., Seattle, WA (US)

( * ) Notice: Subject to any disclaimer, the term of this patent is extended or adjusted under 35 U.S.C. 154(b) by 0 days.

(21) Appl. No.: 09/517,468

(22) Filed: Mar. 2, 2000

(51) Int. Cl.$^7$ .............................................. G06F 17/30
(52) U.S. Cl. ...................................................... 707/102
(58) Field of Search ......................................... 707/102

(56) References Cited

U.S. PATENT DOCUMENTS

| | | | | |
|---|---|---|---|---|
| 5,826,258 A | * | 10/1998 | Gupta et al. | 707/10 |
| 5,913,214 A | * | 6/1999 | Madnick et al. | 707/10 |
| 5,956,720 A | * | 9/1999 | Fernandez et al. | 707/1 |
| 5,970,490 A | * | 10/1999 | Morgenstern | 707/10 |
| 6,012,098 A | * | 1/2000 | Bayeh et al. | 709/200 |
| 6,076,087 A | * | 6/2000 | Suciu | 707/100 |
| 6,094,649 A | * | 7/2000 | Bowen et al. | 707/3 |
| 6,154,738 A | * | 11/2000 | Call | 705/20 |
| 6,263,332 B1 | * | 7/2001 | Nasr et al. | 707/104.1 |
| 6,269,368 B1 | * | 7/2001 | Diamond | 707/3 |
| 6,308,179 B1 | * | 10/2001 | Petersen et al. | 707/10 |
| 6,339,776 B2 | * | 1/2002 | Dayani-Fard et al. | 707/102 |
| 6,343,287 B1 | * | 1/2002 | Kumar et al. | 707/100 |
| 6,356,906 B1 | * | 3/2002 | Lippert et al. | 345/733 |
| 6,356,920 B1 | * | 3/2002 | Vandersluis | 707/501.1 |

FOREIGN PATENT DOCUMENTS

WO    WO 01/17286    3/2001

OTHER PUBLICATIONS

U.S. patent application Ser. No. 09/517,131, Draper, filed Mar. 2, 2000.

U.S. patent application Ser. No. 09/921,010, Draper, filed Aug. 1, 2001.

Daniela Florescu et al, A Performance Evaluation of Alternative Mapping Schemes for Storing XML Data in a Relational Database, an –Experience Paper–, pp. 1–22. (May 1999).

Shanmugasundaram et al., "Relational Databases for Querying XML Documents:Limitations and Opportunities". In Proc. of the 25th VLDB Conf., Edinburgh, Scotland, 1999, 13 pgs.

\* cited by examiner

*Primary Examiner*—Wayne Amsbury
(74) *Attorney, Agent, or Firm*—Perkins Coie LLP (57) ABSTRACT

Semi-structured queries in an information page employing semi-structured data are pre-processed to identify the data to be selectively retrieved from the semi-structured data, and the storage locations of the data in a collection of structured data comprising the semi-structured data. The pre-processing references a description of how the semi-structured data are stored in the collection of structured data. Equivalent structured queries to retrieve the data from the collection of structured data are generated; and the semi-structured queries are replaced with the equivalent structured queries. In one application, these pre-processed information pages are stored to fulfill requests from remote clients, to enhance response time to requests. In response to a request, the requested information page is dynamically completed, executing the replacement equivalent structured queries instead, without having to determine in real time where the semi-structured data are stored in the structured organization.

35 Claims, 11 Drawing Sheets

Figure 1

```
<Entity A>
    <Entity B>
        <Entity C> Data </Entity C>
        <Entity D> Data </Entity D>
    </Entity B>
    <Entity E>
        <Entity F> Data </Entity F>
    </Entity E>
    <Entity G>
        <Entity F> Data </Entity F>
    </Entity G>
    <Entity H>
        <Entity I> Data </Entity I>
    </Entity H>
    <Entity H>
        <Entity I> Data </Entity I>
    </Entity H>
</Entity A>

```
<directory> (100)                                    54"
       <person> (102)
              <name> (104)
                     <first> John </first>  (107, 124)
                     <last> Public </last>  (108, 126)
              </name> (128)
              <home> (105)
                     <address> (110)
                            <line 1> 123 Main St </line1> (112, 130)
                            <city> Anyville </city> (114, 132)
                            <state> WA </state> (116, 134)
                            <zip> 98198 </zip> (118, 136)
                     </address> (138)
                     <phone> 206-255-1234 </phone> (120, 140)
              </home> (142)
              <work> (106)
                     <phone> 206-555-5678 </phone> (122, 144)
              </work> (146)
       </person> (148)
</directoy> (150)
```

| Dir-id | Per-id | Nm-id | Fn-id | Fn-data | ... | Home-id | ... | Work-id |
|---|---|---|---|---|---|---|---|---|
|  |  |  |  |  |  |  |  |  |
|  |  |  |  |  |  |  |  |  |

190

| Home-id | Ph-id | Ph-data |
|---|---|---|
|  |  |  |
|  |  |  |

192

| Work-id | Ph-id | Ph-data |
|---|---|---|
|  |  |  |
|  |  |  |

| In-Context 74a | Parent Node 74b | Child Node 74c | Out-Context 74d | Table 74e | Parent Column 74f | Child Column 74g |
|---|---|---|---|---|---|---|
|  | person | name |  | dir-tbl | per-id | nm-id |
|  | name | first |  | dir-tbl | nm-id | fn-id |
|  | first | data |  | dir-tbl | fn-id | fn-data |
|  |  |  |  |  |  |  |
|  | " | " | " | " | " | " |
|  |  |  |  |  |  |  |
|  | home | phone | h1 | hm-tbl | hm-id | ph-id |
| h1 | phone | data |  | hp-tbl | ph-id | ph-data |
|  | work | phone | w1 | wp-tbl | wk-id | ph-id |
| w1 | phone | data |  | wp-tbl | ph-id | ph-data |

```
<xsl:stylsheet xmlns:xsl=http://www.w3.org/XSL/Transform/1.0>

<xsl:template match:"/">
        <result>
            <xsl: apply-templates
                select="companyrecords/employees/employee"/>
        </result>
    </xsl:template>

<xsl:template match:"employee">
        <xsl:variable name="depid" select=department/@idref/>
        <person>
            <xsl: apply-templates select="name"/>
            <number><xsl:value-of select="phone"/></number>
            <depname>
                <xsl: apply-templates
                    select="//department[@id=$depid]/name"/>
            </depname>
        </person>
    </xsl:template>
                                                            502

<xsl:template match:"employee/name">
        <xsl:value-of select= "first" />
        <xsl: text> </xsl:text>
        <xsl:value-of select= "last" />
    </xsl:template>

<xsl:template match:"department/name">
        <xsl:value-of select= "." />
    </xsl:template>

</xsl:stylesheet>
```

Figure 12a

```
<companyrecords>
    <employees>
        <employee>
            <name><first>fname</first><last>lname</last></name>
            <ssn>ssn</ssn>
            <department idref=deptid/>
            <phone>xxx-xxxx</phone>
        </employee>
    </employees>                                              504
    <departments>
        <department id=deptid>
            <name> dept name </name>
        </department>
    </departments>
</companyrecords>
```

Figure 12b (QueryLoop   "Select    name.first, name.last, employee.phone,
                        name2.pcdata,
             From       companyrecords, multiemployee,
                        Employee, name, companyrecords as cr2,
             Where      companyrecords.employees = multiemployee.id AND
                        cr2.departments = multidepartment.id AND
                        multidepartment.department = department.id AND
                        department.id = employee.idref,
                        department.name = name2.id)
                                                              506
(CreateElement "result")
    (Group "") // empty group operation groups all inside 'result"
        (CreateElement "person")
            (CreateText "$QL.1 $QL.2")
            (CreateElement "phone" body="$QL.3")
            (CreateElement "depname" body="$QL.4")

METHOD AND APPARATUS FOR GENERATING INFORMATION PAGES USING SEMI-STRUCTURED DATA STORED IN A STRUCTURED MANNER

BACKGROUND OF THE INVENTION

1. Field of the Invention

The present invention relates to the field of data processing. More specifically, the present invention relates to the generation of information pages using semi-structured data.

2. Background Information

Increasingly, because of its richness in functions and extensibility, information pages, such as web pages, are being constructed using the extensible style language (XSL) and semi-structured data, such as extensible markup language (XML) encoded data.

"Semi-structured data" refers to data that has structure, but where the contents of particular structural elements need not be consistent. To facilitate this characteristic, data are "self-describing". For example, in a "person" application, a person can be validly defined by semi-structured data with only a subset of all possible data associated with a person, e.g., by only a last name and a telephone number, or a first name, last name, and address, or some other combinations. Or, a person may be defined with additional data not previously seen, such as an employer name, an employer address, and an employer telephone number. Thus, each semi-structured "person" definition may vary.

"XML" is one example of a language for representing semi-structured data. XML is a subset of the Standard Generalized Markup Language (SGML), a system promulgated by the International Standards Organization (ISO) for organizing and tagging elements of a document. Interpretation of the XML tags, however, is left to an interpreter. Thus, XML is adaptable to a wide variety of purposes. In particular, since XML is based on plain text, and therefore, XML based documents can be received and processed by many different computing platforms, such as by a platform-independent browser or other networked application programs.

"Structured data", in contrast, refers to data formats such as those used for databases, spreadsheets, address books, and so forth, where in each case, the data format is well-defined by a schema and essentially inflexible. For example, in the database context, a database can be defined to store data according to some data-storage requirements. The storage requirements, e.g., the schema or nature of valid input, are known in advance, and the database is defined according to the structure of the potential input data. If the database were storing information about person, such as first name, last name, address, telephone number, and employer, every person record in the database would have space allocated for the information being tracked. Hence, the database is structured.

An example of a structured database is the relation database, also referred to as SQL database, where SQL is the name of its query language, Structured Query Language. In addition to being "inflexible", unlike semi-structured data, SQL databases are also platform dependent. Nevertheless, because of its availability as well as robustness, recent research has turned towards using structured databases, such as a SQL database, to store and retrieve information defined by semi-structured data.

One significant issue, however, is how to convert from semi-structured data, such as XML encoded data, to structured data storage, such as a SQL database. Towards this end, various approaches have been proposed. For example, see Florescu et al., *A Performance Evaluation of Alternative Mapping Schemes for Storing XML Data in a Relational Database*, Rapport de Recherche No. 3680, INRIA, Rocquencourt, France (May 1999), discusses techniques and issues related to using directed graphs to represent semi-structured data. And, Shanmugasundaram et al, *Relational Databases for Querying XML documents: Limitations and Opportunities*, Proceedings of the $25^{th}$ VLDB Conference, Edinburgh, Scotland (1999), discusses using XML document type descriptors (DTDS) to convert XML documents to relational tuples.

A significant limitation of these and other current conversion approaches is that mapping between structured and semi-structured data formats is by way of applying a fixed set of "rules" to perform the mapping. That is, in each of the these techniques, one and only one mapping is possible. For a given semi-structured input, the conversion rules control conversion into corresponding structured database output. The conversion is not flexible.

Thus, a more flexible approach to handling semi-structured data in a structured manner is desired.

SUMMARY OF THE INVENTION

Semi-structured queries in an information page employing semi-structured data are pre-processed to identify the data to be selectively retrieved from the semi-structured data, and the storage locations of the data in a collection of structured data comprising the semi-structured data. The pre-processing references a description of how the semi-structured data are stored in the collection of structured data. Equivalent structured queries to retrieve the data from the collection of structured data are generated; and the semi-structured queries are replaced with the equivalent structured queries.

In one application, these pre-processed information pages are stored to fulfill requests from remote clients. In response to a request, the requested information page is dynamically completed, executing the replacement equivalent structured queries instead.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented using terms such as tables, keys, identifiers and so forth, commonly employed by those skilled in the art to convey the substance of their work to others skilled in the art. Parts of the description will be presented in terms of operations performed by a computer system, using terms such as parsing, accessing, retrieving, and so forth. As well understood by those skilled in the art, these quantities take the form of electrical, magnetic, or optical signals capable of being stored, transferred, combined, and otherwise manipulated through mechanical and electrical components of a digital system; and the term digital system include general purpose as well as special purpose data processing machines, systems, and the like, that are standalone, adjunct or embedded.

Various operations will be described as multiple discrete steps performed in turn in a manner that is most helpful in understanding the present invention, however, the order of description should not be construed as to imply that these operations are necessarily order dependent, in particular, the order the operations are presented. Furthermore, the phrase "in one embodiment" will be used repeatedly, however the phrase does not necessarily refer to the same embodiment, although it may.

Figure 1:
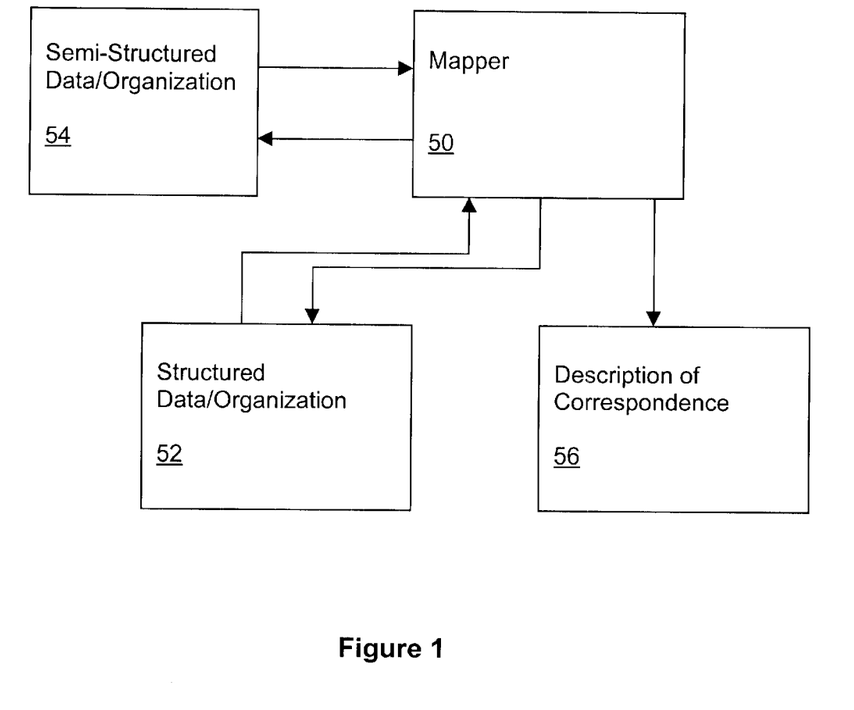
FIG. 1 illustrates an overview of the mapping aspect of the present invention.

Referring now to FIG. 1, wherein a block diagram illustrating an overview of the data representation aspect of the present invention, in accordance with one embodiment. As illustrated, mapper 50 incorporated with the teachings of the present invention, is equipped to generate structured organization 52 to store semi-structured data 54. Collaterally, mapper 50 also generates description 56 of how semi-structured data 54 are stored under structured organization 52. As will be described in more detail below, the collateral generation of description 56 advantageously enables mapper 50 to generate structured organization 52 in any one of a number of approaches. That is, under the present invention, unlike any of the prior art techniques, the generation of structured organization 52 is not bounded or fixed to one particular mapping approach.

Figure 2A:
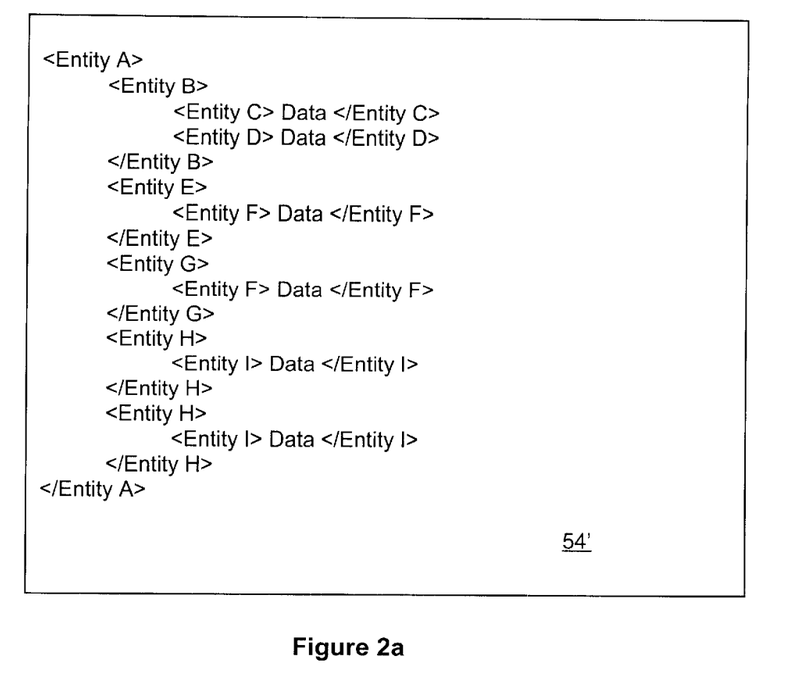
FIGS. 2a–2b illustrate semi-structure data and its logical representation, in accordance with one embodiment.
Figure 2B:
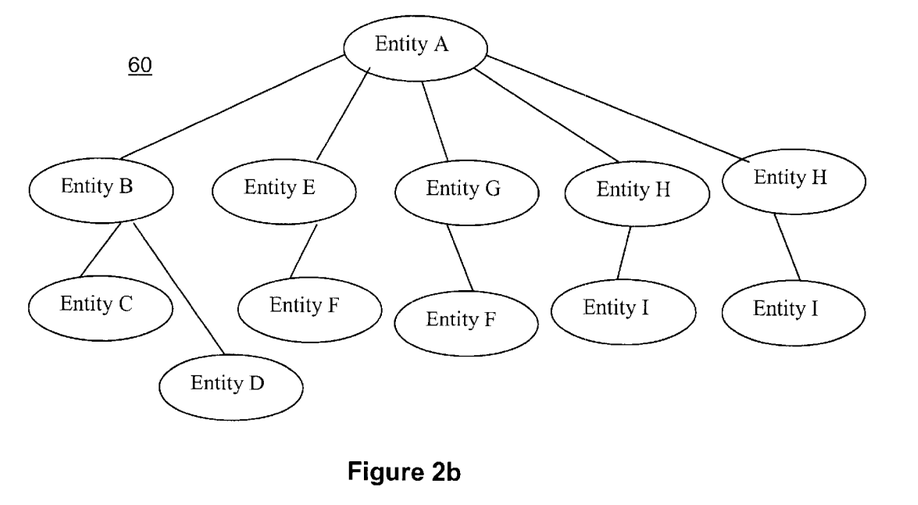

FIGS. 2a–2b illustrate semi-structured data and its logical representation, in accordance with one embodiment. As illustrated, semi-structured data 54' includes a number of entities or data elements, each delineated by a pair of tags, e.g. entity A by tags <entity A> and </entity A>, entity B by tags <entity B> and </entity B>, and so forth. Some entities, like entities F and H have multiple instantiations. The entities/instantiations have an hierarchical relationship to each other; and may be logically represented by tree structure 60, having corresponding number of nodes, one for each entity/instantiation, and edges interconnecting the nodes whose represented entities/instantiations are direct ancestors/descendants of each other, as shown.

Entity A is said to be the parent entity of entities B, E, G and H. Entities B, E, G and H are said to be the children entities of entity A. Similarly, entity B is said to be the parent entities for entities C and D respectively, whereas entities E, G and the two instantiations of entity H are the parent entities for the two instantiations of entity F, and the two instantiations of entity I respectively. The two instantiations of entity F, and the two instantiations of entity I are said to be the children entities of E, G and the two instantiations of entity H respectively.

The two instantiations of entity F are said to be instantiated in two contexts, the context of entity E and the context of entity G. An example is a "phone" entity instantiated in the context of a "home" entity, and in the context of a "work" entity, i.e. in first case, a home phone number, and in the second case, a work phone number. The two instantiations of entities H and I are said to be repeated occurrences of the entities. An example is an "offspring" entity and its descendant "offspring name" entity, where each occurrence represents a son/daughter of a person.

Figure 3:
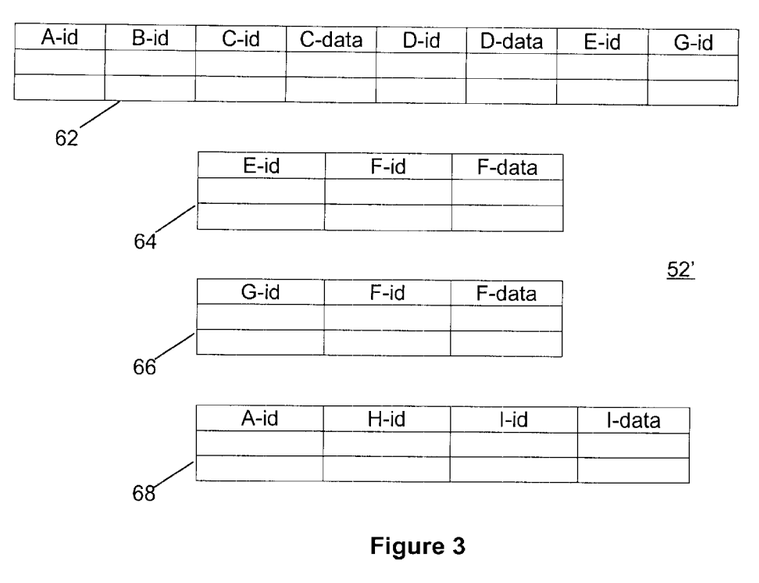
FIG. 3 illustrates a structured organization for storing the semi-structured data of FIGS. 2a–2b, in accordance with one embodiment.

FIG. 3 illustrates a structured organization for storing the semi-structured data of FIGS. 2a–2b, in accordance with one embodiment. As illustrated, structured organization 52' includes four relational tables 62–68. Table 62 includes one column each for storing identifiers of entities A, B, C, D, E, and G, and data for entities C and D. Table 64 includes one column each for storing identifiers for entities E and F, and data for entities F, whereas table 66 includes one column each for storing identifiers for entities G and F, and data for entities F. Similarly, table 68 includes one column each for storing identifiers for entities A, H and I, and data for entity I. The organization of these relational tables is characterized by the fact that entities having the possibility of multiple instantiations are stored in separate tables. The approach is said to be a normalized organization of the relational tables.

Figure 4:
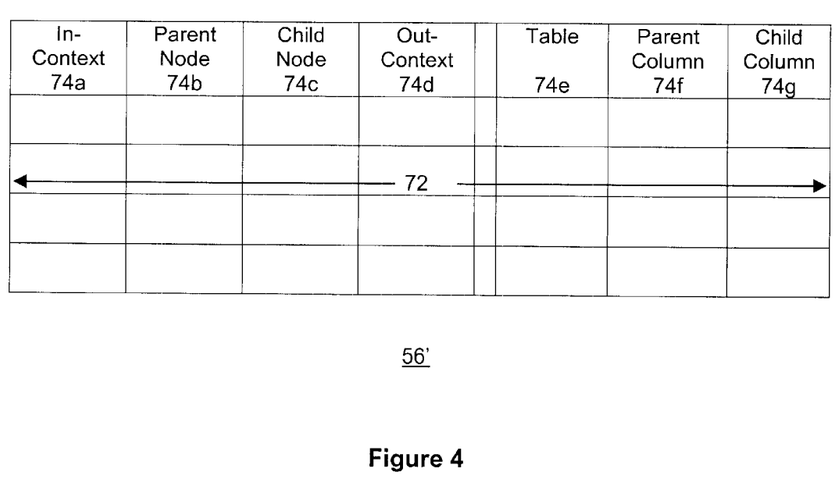
FIG. 4 illustrates a description of correspondence between the semi-structured data and the structured storage, in accordance with one embodiment.

FIG. 4 illustrates description of correspondence between the semi-structured data and the generated structured organization, in accordance with one embodiment. As illustrated, description 56' is a meta-table having a number of row entries 72, one for each pair of parent and child nodes. Meta-table 56' includes seven columns 74a–74g, storing identifiers for the in-context, the parent node, the child node, the out-context, the storage table, the parent column and the child column. That is, columns 74a–74d track the hierarchical information of semi-structured data 54, and columns 74e–74g track the storage location information of the structured organization 52. Additionally, meta-table 56' includes a number of miscellaneous columns (not shown) for storing various flags and annotations. These miscellaneous flags and annotations include e.g. a flag that distinguishes between an "element" versus an "attribute", an annotation that denotes whether a child can occur more than once with respect to a parent, another annotation that denotes whether the child must occur at all. Each row entry 72 always contains information in columns 74b–74c and 74e–74g Row entries 72 for parent-child pairs involving multiple instantiations also contain information in the "context" columns 74a and 74d. Where applicable, row entries 72 also include the aforementioned flags and annotations.

Figure 5:
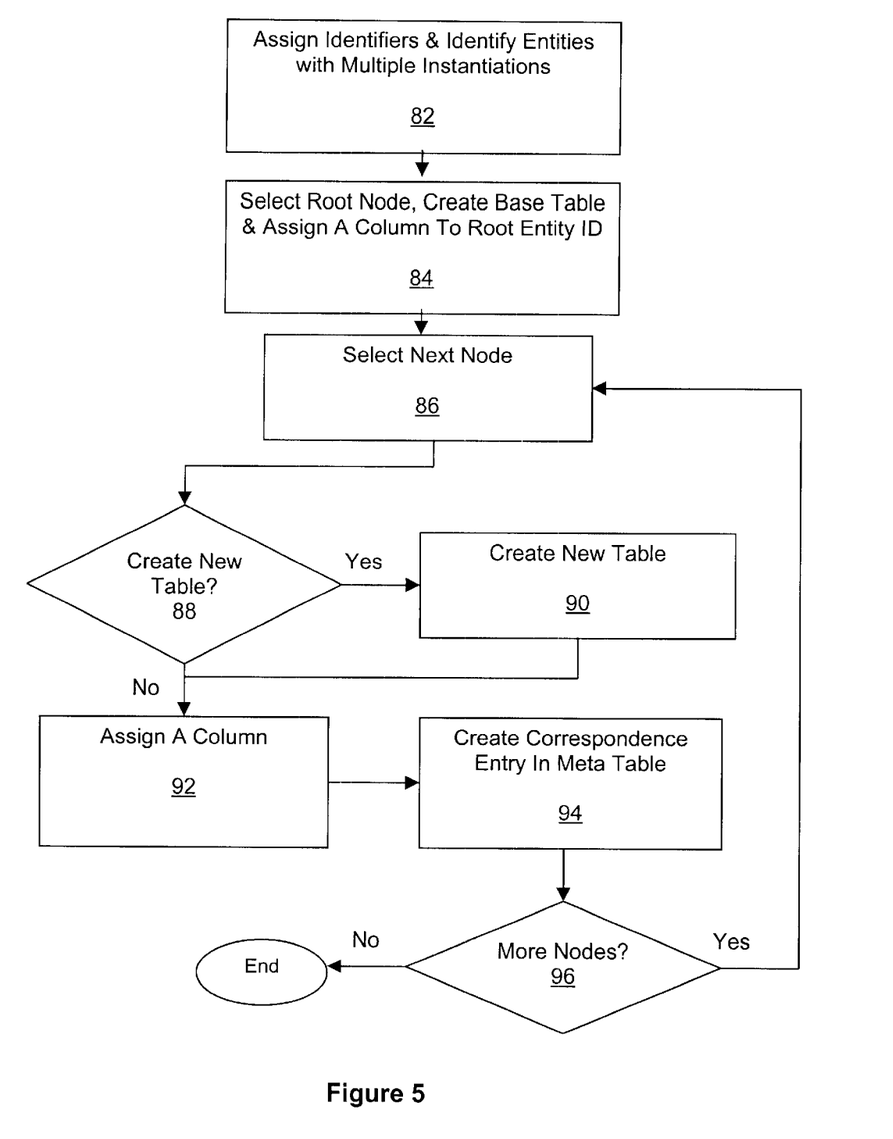
FIG. 5 illustrates the operation flow of the mapper of FIG. 1, in accordance with one embodiment.

FIG. 5 illustrates the operation flow for mapper 50, in accordance with one embodiment. In this embodiment, it is assumed that structured organization 52 is generated in the normalized approach described earlier, referencing FIG. 3, and meta-table 56' of FIG. 4 is employed for description 56. As illustrated, at 82, mapper 50 traverses a logical representation of semi-structured data 54 assigning identifiers to all entities (and if applicable, their multiple instantiations). At the same, mapper 50 also keeps track of all entities with multiple instantiations, as well as setting the applicable flags and recording the applicable annotations. At 84, mapper 50 selects the root node, creates a base table, and assigns a first column of the base table for the root entity.

At 86, mapper 50 selects a next node. At 88, mapper 50 determines if a new table should be created to store data associated with the entity. For the illustrated embodiment, a new table is created if the entity is one that has multiple instantiations, and a separate table has not been previously created. In alternate embodiments, other criterion or criteria may be employed to determine whether a new table is to be employed or not. If a new table is to be employed, the new table is created at 90. Otherwise 90 is skipped. At 92, a column is assigned to store the identifier/data associated with the entity. At 94, an entry is added to meta-table 56' to keep track of where the identifier/data of the entity is stored. As described earlier, the entry includes parent node information, its own node information, the table name/identifier, the column location of the parent, and its own column location. For entity or parent entity with multiple instantiations requiring context differentiation, either an out-context identifier or an in-context identifier is also stored. Context identifiers may be formed in any manner. Where applicable, the entry also includes the applicable flags and annotations.

At 96, mapper 50 determines if it has processed all nodes. If additional nodes are to be processed, operations 86–94 are repeated. The operations are repeated as many times as it is necessary to process all nodes. In due course, all nodes are processed. At such time, the processing terminates.

Figure 6A:
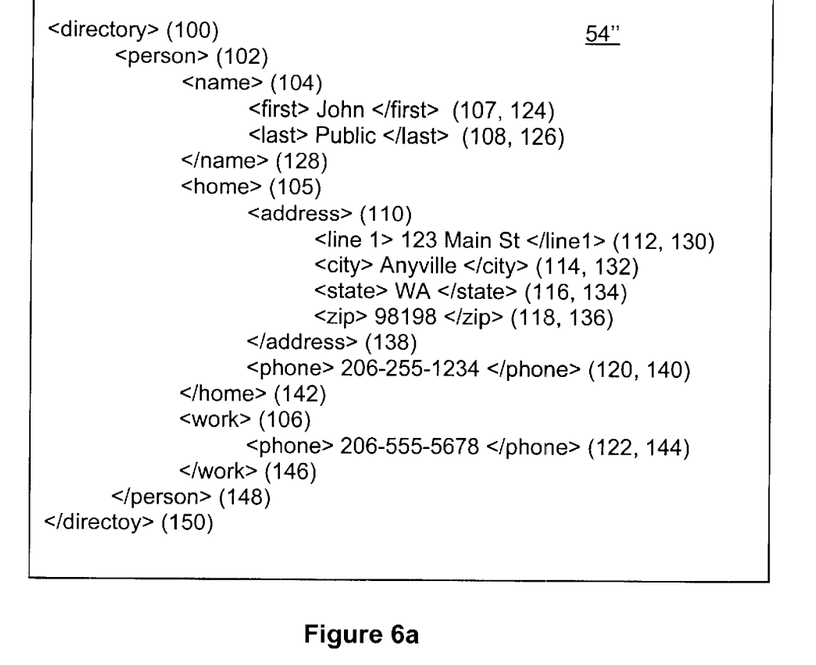
FIGS. 6a–6b illustrate an example semi-structure data and its logical representation.
Figure 6B:
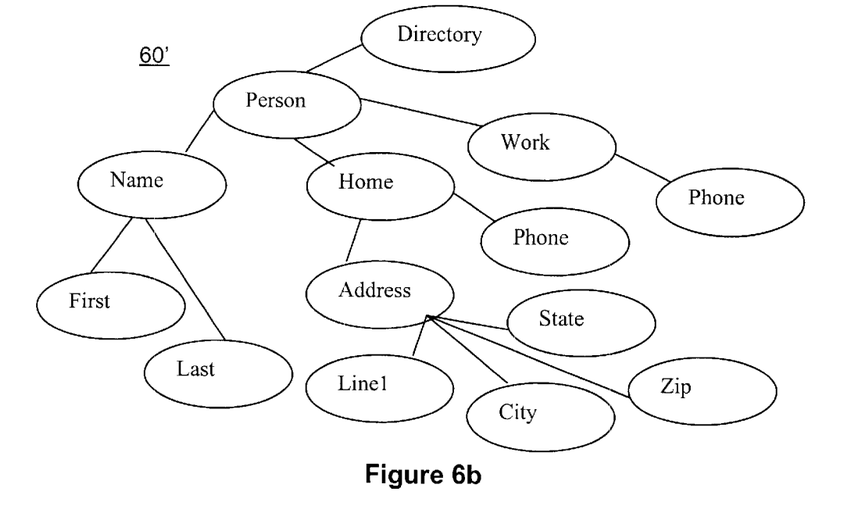

FIGS. 6a–6b illustrate an example semi-structured data 54" and its logical representation. The example "directory" semi-structured data 54", delineated by the <directory> and </directory> tags 100 and 150, as illustrated in FIG. 6a, includes the entities "person", "name", "first name", "last name", "home", "address", "line1", "city", "state", "zip", "phone" (in the context of "home"), "work", and "phone" (in the context of "work"), delineated by the respective tag pairs, i.e. 102 and 148, 104 and 128, and so forth. The example "directory" semi-structured data may be logically represented by tree structure 60' of FIG. 6b. Tree structure 60' includes root node "directory" 162, "person" node 164, "name" node 166, "first name" node 168, "last name" node 170, "home" node 172, "address" node 174, "line 1" node 176, "city" node 178, "state" node 180, "zip" node 182, "home phone" node 184, "work" node 186, and "work phone" node 188.

Figure 7:
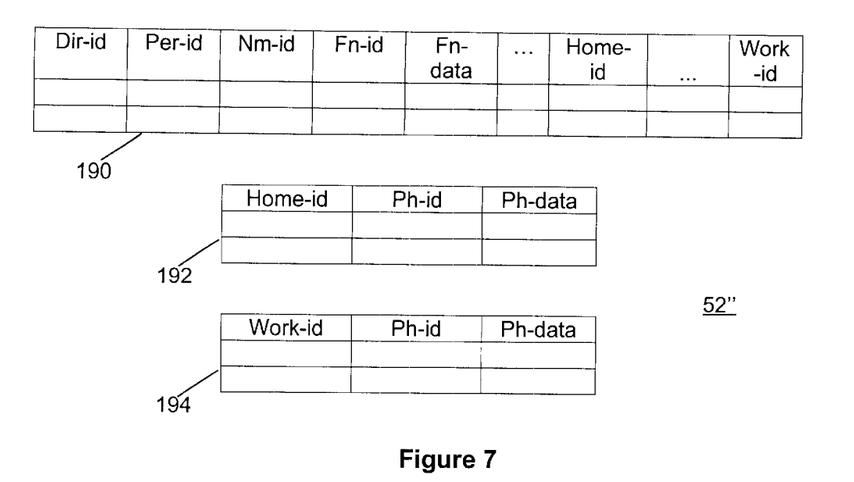
FIG. 7 illustrates an example structured data for storing the semi-structured data of FIGS. 6a–6b.

FIG. 7 illustrates the resulting structure organization 52" generated by mapper 50 to store the semi-structured data 54", in accordance with the earlier described embodiment referencing FIGS. 3 and 5. As illustrated, structure organization 52" includes tables 190–194. Directory table 190 stores person id, name id, first name id, first names, last name id, last names, home id, address id, line 1 id, line 1 data, city id, city names, state id, state names, zip id, zip code, and work id (not all columns are shown). Home phone table 192 stores home id, phone id, and phone numbers (home), whereas work phone table 914 stores work id, phone id and phone numbers (work).

Figure 8:
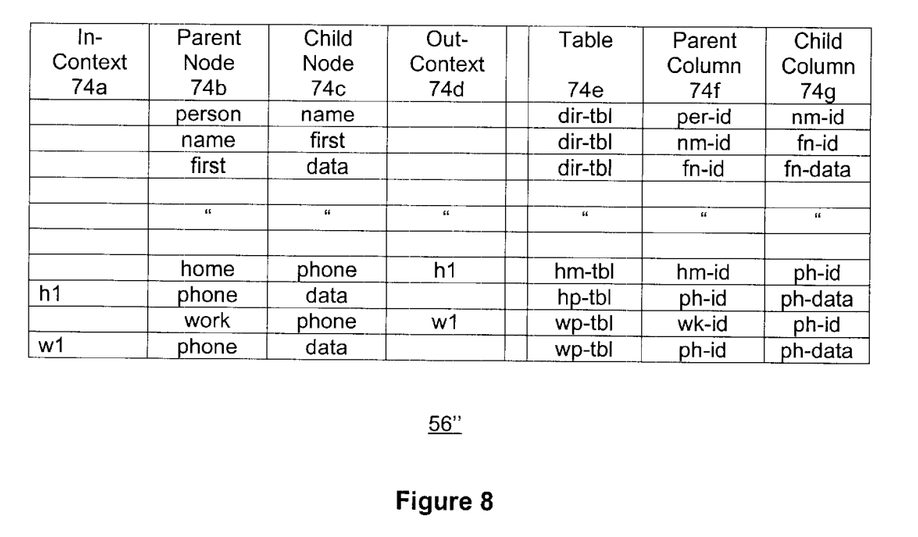
FIG. 8 illustrates an example description of correspondence between the semi-structured data and the structured storage of FIGS. 6a–6b and 7.

FIG. 8 illustrates the resulting meta-table 56" generated by mapper 50 to store the correspondence between the semi-structured data of FIGS. 6a–6b and the structured organization of FIG. 7, in accordance with the earlier described embodiment referencing FIGS. 4–5. As described earlier, each entry contains the information for each parent-child node pair pointing to the table and column storage locations for the parent and child identifier/data (not all rows are shown). The entries for the home and phone node pair, and the work and phone node pair include the storage of a context qualifier (arbitrarily named as "h1" and "w1") identifying which phone and data node pair points to the correct storage locations for the phone data. For ease of understanding, the miscellaneous flags and annotations are omitted.

Note that in addition to the already mentioned advantage that mapper 50 may employ any one of a number approaches to generate structured organization 52, the present invention also allows a data base administrator (DBA) to manually intervene and adjust the generated structured organization 52. The DBA may easily maintain the correspondence by making like kind adjustments to the collaterally generated meta-table 56. Such adjustments are often desirable as in real life applications, by virtue of the number of entities involved, which is typically much larger than the illustrated examples (as they were kept small for ease of understanding), the generated structured organization 52 may not be as efficient as desired.

Referring now back to FIG. 1, in accordance with another aspect of the present invention, mapper 50 incorporated with the teachings of the present invention, is also equipped to generate semi-structured data organization 54 for a collection of structured data 52. In like manner, mapper 50 also collaterally generates description 56 of correspondence between semi-structured data organization 54 and structured data 52. Thus, the present invention also advantageously enables legacy structured data to be employed in a semi-structured manner.

Figure 9:
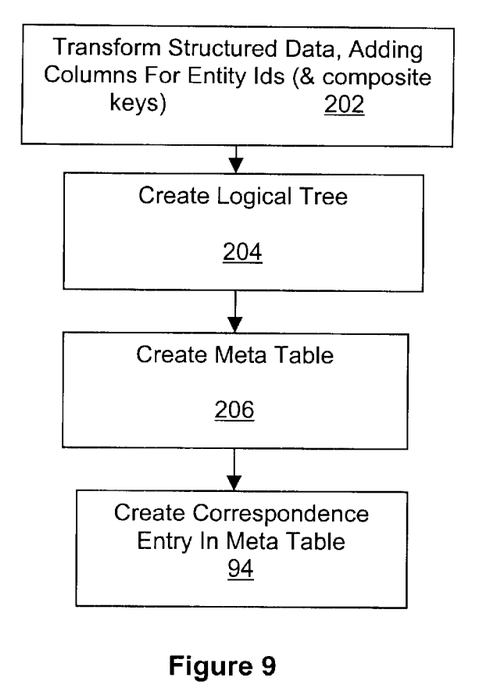
FIG. 9 illustrates the operational flow of mapper 50 for generating semi-structured organization for structured data.

FIG. 9 illustrates the operational flow of mapper 50 for generating semi-structured organization 54 for structured data 52. At 202, mapper 50 transforms structured data 52 adding corresponding companion columns to the tables to store entity identifiers for the stored entity data. In one embodiment, mapper 50 also adds corresponding columns to the tables to store a composite key formed with the access keys of the tables. For example, in a table, having two columns storing the last and first names of persons as accessing keys, a column is added to store a composite key formed with the last and first names of the persons. At 204, mapper 50 constructs a logical tree structure similar to the ones illustrated in FIGS. 2b and 6b, based on the columns storing entity identifiers. At 206, mapper 50 creates meta table 56 as described earlier. At 208, mapper 50 generates semi-structured organization 54 using the generated logical tree structure.

Accordingly, the vast volume of legacy structured data may be employed in modern information pages using semi-structured data.

Figure 10:
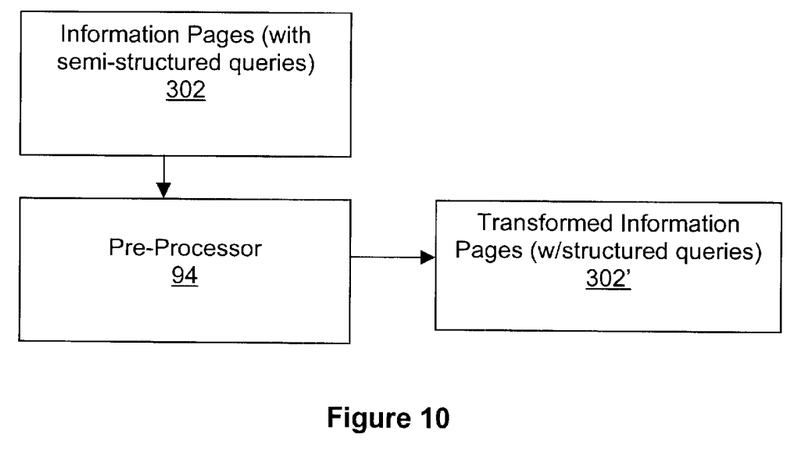
FIG. 10 illustrates the pre-processing aspect of the present invention.

FIG. 10 illustrates an overview of yet another aspect of the present invention. Shown are information pages 302 formed using a language that allows for the use of semi-structured queries, such as XSL, and employment of semi-structured data, like XML encoded data, stored in a structured manner. The correspondence between the semi-structured data and the structured organization are described using the earlier described meta-table or a description mechanism of like kind. Pre-processor 304, incorporated with the teachings of the present invention, is equipped to pre-compile information pages 302, to generate pre-processed information pages 302', replacing the semi-structured queries with equivalent structured queries to retrieve the required data from the structured data storage. Thus, at fulfillment time, that is in response to a request for one of the information pages, the requested information page may be dynamically completed with the required data, without having to determine in real time where the required semi-structured data are stored in the structured data storage. As a result, a request may be fulfilled with a shorter latency. In other words, the present invention also advantageously enables speed up of fulfillment of requested information pages that have to be dynamically completed with semi-structured data retrieved in real time.

Figure 11:
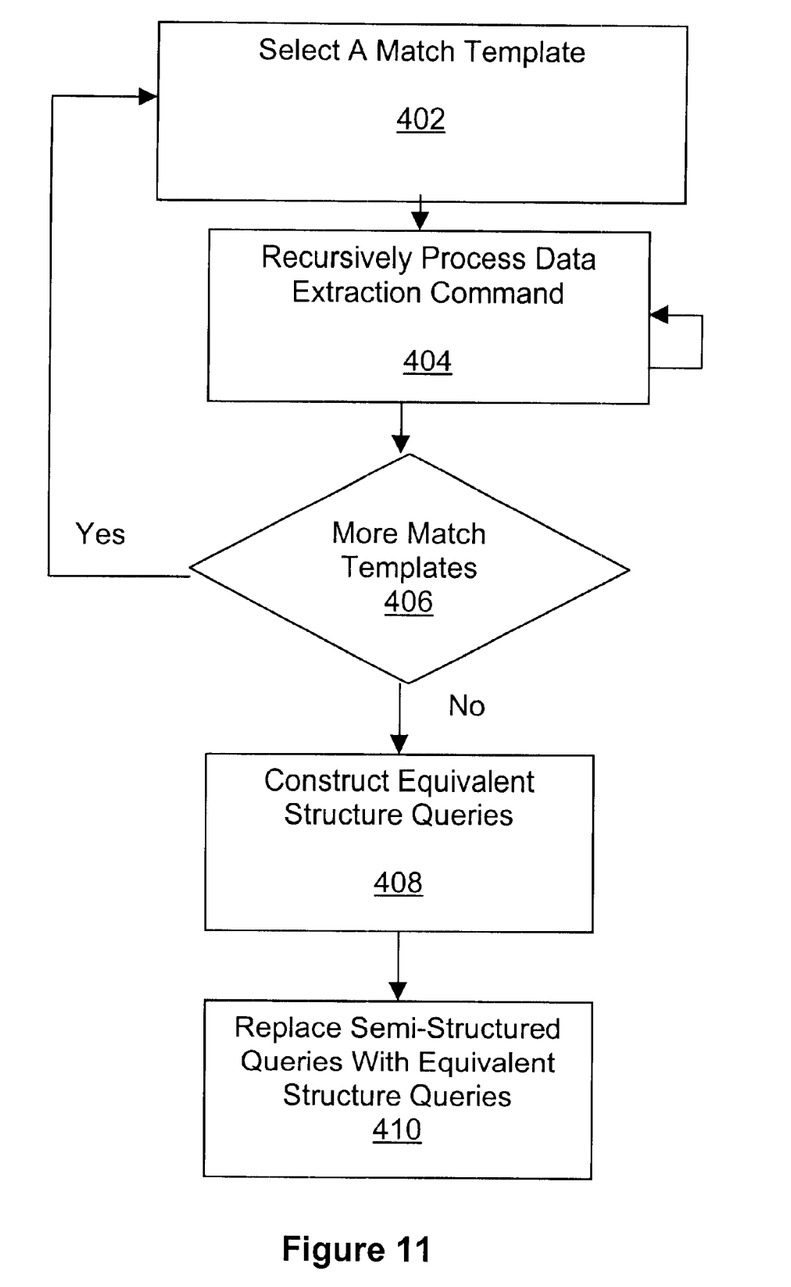
FIG. 11 illustrates the operation flow of the pre-processor of FIG. 10, in accordance with one embodiment.

FIG. 11 illustrates the operational flow of pre-processor 304, in accordance with one embodiment. At 402, pre-processor 304 selects a match template for pre-processing. At 404, pre-processor 304 recursively pre-processes data extraction commands within the selected match template, using the above described meta-table. Pre-processor 304 identifies the entity of the semi-structured data, whose data are to be extracted. Pre-processor 304 then uses the meta-table to determine the storage locations for the entity data in the structured data storage. Where necessary, pre-processor 304 cumulates the join conditions for joining the relational tables of the structured data storage to extract the required entity data. At 406, pre-processor determines if all match templates have been processed. If additional match templates are to be processed, operations 402–404 are repeated. Operations 402–404 are repeated as many times as necessary, until all match templates are processed. In due course, all match templates are processed. At such time, 408, pre-processor 304 uses the cumulated information and generates equivalent structured queries to retrieve the required data from the structured data storage. Where applicable, the generation may include generation of an associated control structure to control the repeated execution of a: structured query, to iteratively obtain all or a subset of the required data from the structured data storage. At 410, pre-processor 304 replaces the semi-structured query/queries with the generated equivalent structured query/queries, and associated control structure or structures, if any.

Figure 12A:
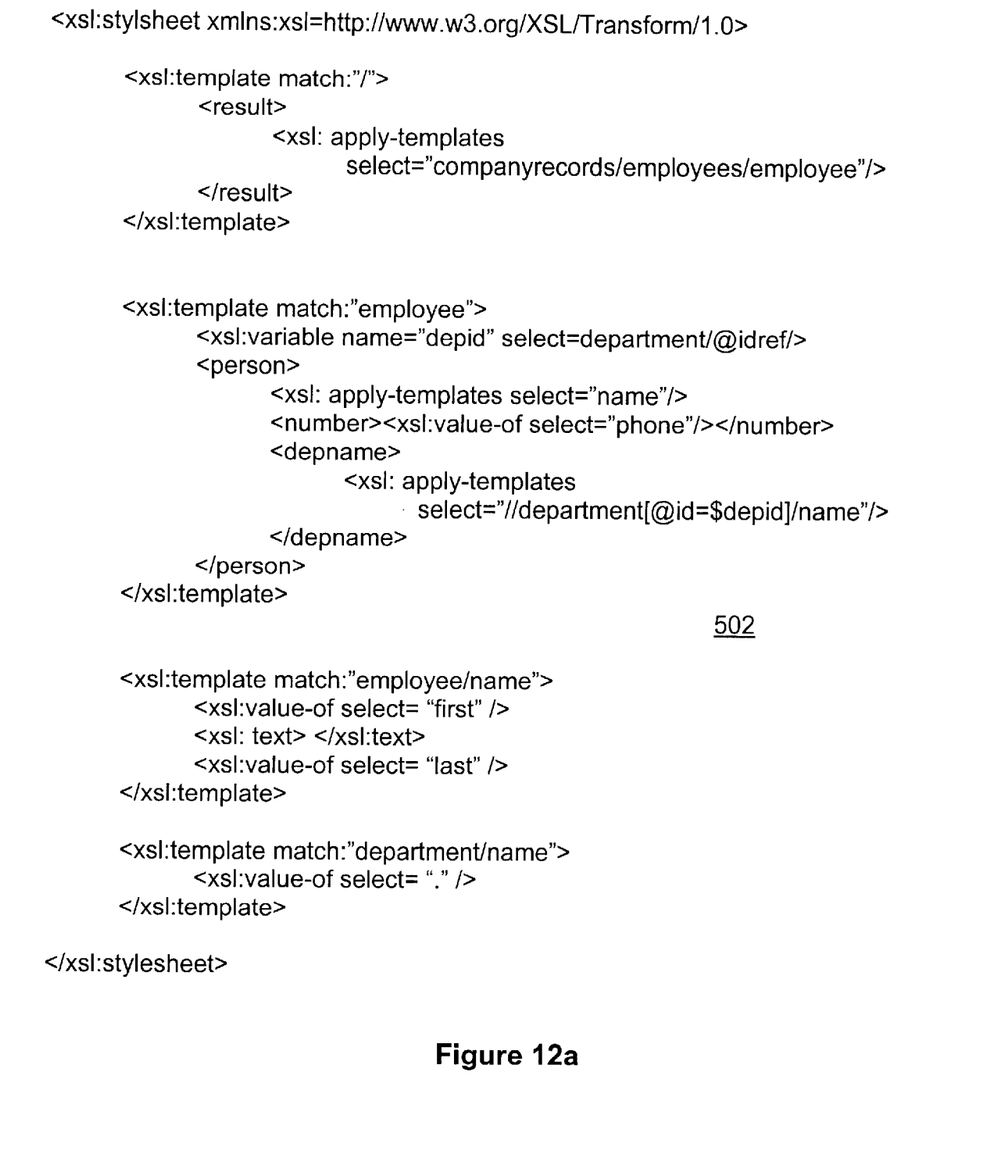
FIGS. 12a–12c illustrate an example pre-processing of an information page.
Figure 12B:
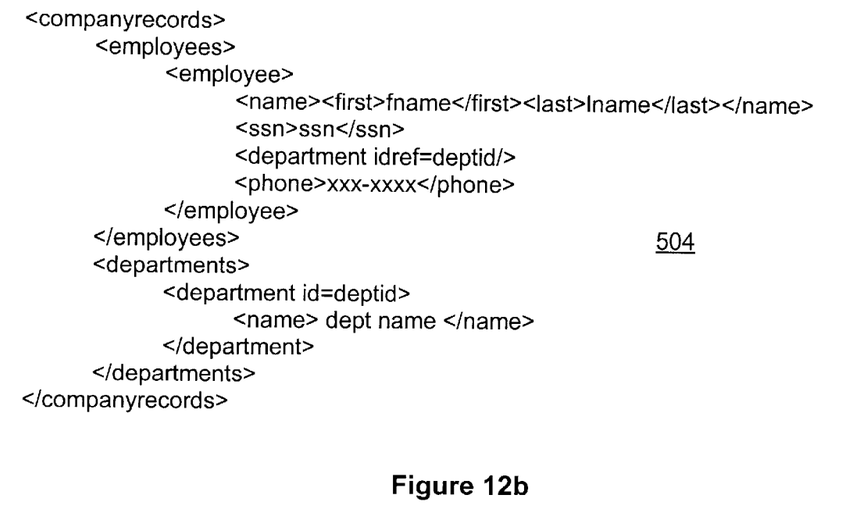
Figure 12C:
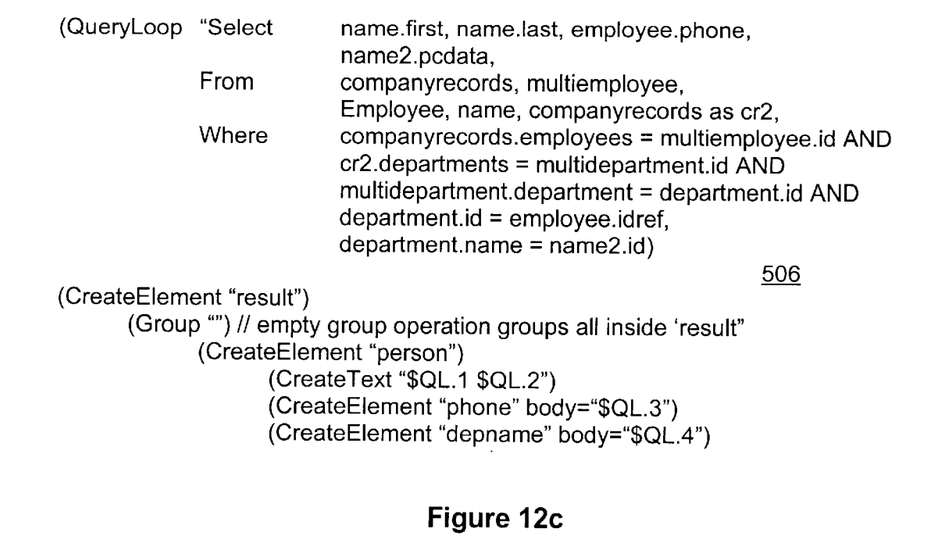

Thus, pre-processed information pages 302' are now primed to readily respond to their requests. FIGS. 12a–12c illustrate a specific example of preprocessing an information page. Shown in FIG. 12a is an example XSL document 502 having a number of match templates. Each matching template includes one or more data extraction commands, such as select, value-of, apply template, and the like. FIG. 12b illustrates a schema of the underlying semi-structured data 504. FIG. 12c illustrates the resulting replacement structured query ("Query Loop") 506, including the join conditions, and the control structure to re-use the structured query ($QL.1, $QL.2, and so forth).

Figure 13:
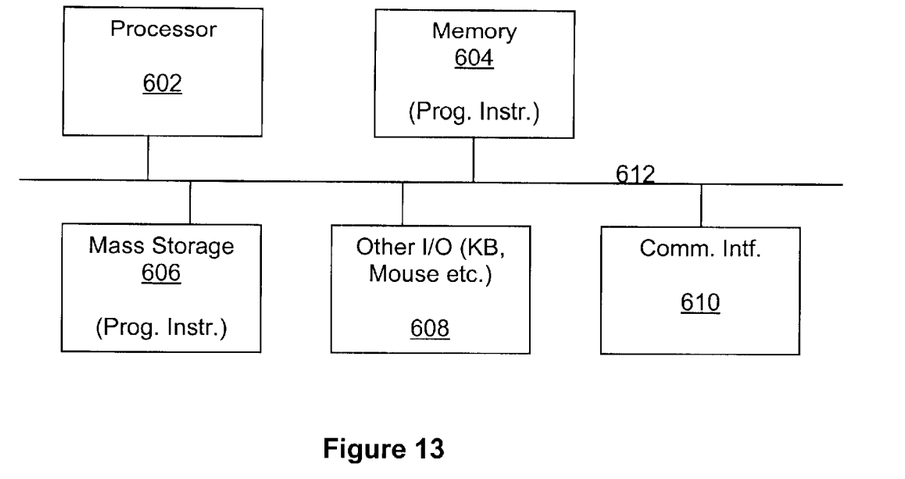
FIG. 13 illustrates a computing environment suitable for practicing the mapping and pre-processing aspects of the present invention.

FIG. 13 illustrates an example computing environment suitable for practicing the mapping and the pre-processing aspects of the present invention. Example computing environment 600 includes one or more processors 602 and system memory 604. Additionally, computing environment 600 includes mass storage devices 606 (such as diskette, hard drive, CDROM and so forth), input/output devices 608 (such as keyboard, cursor control and so forth) and communication interfaces 610 (such as network interface cards, modems and so forth). The elements are coupled to each other via system bus 612, which represents one or more buses. In the case of multiple buses, the buses are bridged by one or more bus bridges (not shown). Each of these elements perform its conventional functions known in the art. In particular, system memory 604 and mass storage 606 are employed to store a working copy and a permanent copy of the programming instructions implementing the earlier described mapper and/or pre-processor of the present invention. In one embodiment, the implementing programming instructions are a subset of a larger collection of programming instructions implementing a development toolkit that facilitates development of applications that access databases. In another embodiment, the implementing programming instructions are a subset of a large collection of programming instructions implementing a database manager and related functions. The permanent copy of the programming instructions may be loaded into mass storage 606 in the factory, or in the field, through a distribution medium (not shown) or through communication interface 610 (from a distribution server (not shown)). The constitution of these elements 602–612 are known, and accordingly will not be further described.

Figure 14:
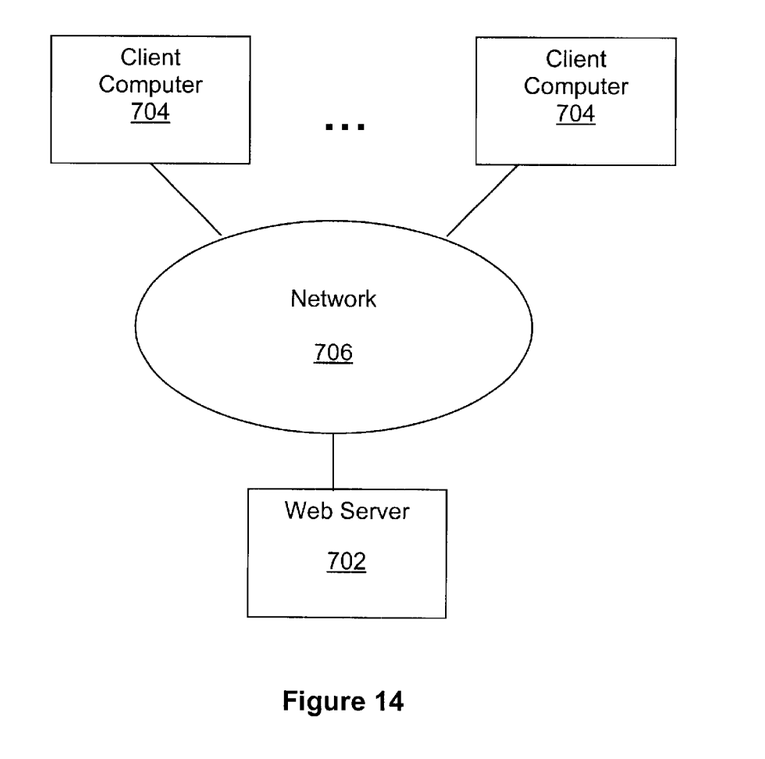
FIG. 14 illustrates a network environment suitable for using the information pages pre-processed in accordance with the present invention.

FIG. 14 illustrates an example network environment suitable for exploiting information pages pre-processed in accordance with the present invention. Network environment 700 includes web server 702 and a number of client computers 704 coupled to web server 702 through network 706. Web server 702 is provided with information pages formed with a language like XSL, using semi-structured data, like XML encoded data, stored in a structured data storage, and the information pages are pre-processed as earlier described, i.e. with the semi-structured queries being replaced by equivalent structured queries (and associated control structures, if any). Client computers 704 request selected ones of the information pages from web server 702. Web server 702 fulfills the requests, dynamically completing the information pages, retrieving the required data from the structured data storage, using the replacement equivalent structured queries. Accordingly, the requests of client computers 704 are fulfilled with shorter latencies.

Web server 702 and client computers 704 are intended to represent a broad range of server and computers known in the art. Network 706 is intended to represent a broad range of private and public networks, such as the Internet, constituted with networking equipment, such as routers, gateways, switches and the like.

Thus, a method and apparatus for storing semi-structured data in a structured manner, and for generating information pages using semi-structured data so stored have been described.

Epilogue

While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method in a computer system for applying a semi-structured query to structured data, the method comprising:
providing a mapping between a structured schema and a semi-structured schema;
receiving the semi-structured query;
generating a structured query based on the received semi-structured query and based on the provided mapping; and
applying the structured query to structured data stored in accordance to the structured schema.

2. The method of claim 1 including storing the data resulting from the applied structured query as semi-structured data in accordance with the provided mapping.

3. The method of claim 1 wherein the providing of the mapping includes automatically generating the mapping.

4. The method of claim 1 wherein the generating of the structured query includes processing a match template of the semi-structured query.

5. The method of claim 4 wherein the processing of a match template includes processing of data extraction commands.

6. The method of claim 1 wherein the generating of the structured query includes identifying joins for tables of the structured data.

7. The method of claim 1 wherein the structured query is an SQL query.

8. The method of claim 1 wherein the semi-structured query is an XSL transform.

9. The method of claim 1 wherein the semi-structured query is an XML-based query.

10. The method of claim 1 wherein the semi-structured schema is derived from analysis of semi-structured data.

11. The method of claim 1 wherein semi-structured data is converted to structured data using the provided mapping.

12. The method of claim 1 wherein the provided mapping includes for each parent and child relationship in the semi-structured data, a mapping from a parent identifier and a child identifier of the parent and child relationship to a table identifier of a table in the structured data that corresponds to the parent and child relationship.

13. The method of claim 12 wherein each mapping further includes a parent key identifier and a child key identifier of the table that correspond to the parent identifier and child identifier of the mapping.

14. The method of claim 12 wherein the provided mapping includes for each child of a parent and child relationship that is also not a parent, a mapping from the child identifier of that child to a table identifier of a table in the structured data.

15. The method of claim 14 wherein the mapping from the child identifier of that child also maps to a child key identifier in the table.

16. The method of claim 14 wherein the mapping from the child identifier of that child also maps to an indicator as to whether the child is an attribute or an element of its parent.

17. The method of claim 14 wherein the mapping from the child identifier of that child also maps to a child value identifier in the table.

18. The method of claim 1 wherein the provided mapping supports recursive definition of elements of the semi-structured data.

19. A computer system for applying a semi-structured query to structured data comprising:
a mapping between a structured schema and a semi-structured schema;
means for storing the semi-structured query; and
means for generating a structured query from the stored semi-structured query and the mapping.

20. The computer system of claim 19 including:
means for applying the structured query to structured data stored in accordance to the structured schema.

21. The computer system of claim 20 including means for storing the data resulting from the applied structured query as semi-structured data in accordance with the mapping.

22. The computer system of claim 19 wherein the mapping is automatically generated.

23. The computer system of claim 19 wherein the means for generating the structured query processes a match template of the semi-structured query.

24. The computer system of claim 23 wherein the processing of a match template includes processing of data extraction commands.

25. The computer system of claim 19 wherein the means for generating the structured query includes identifying joins for tables of the structured data.

26. The computer system of claim 19 wherein the structured query is an SQL query.

27. The computer system of claim 19 wherein the semi-structured query is an XSL transform.

28. The computer system of claim 19 wherein the semi-structured query is an XML-based query.

29. The computer system of claim 19 wherein the semi-structured schema is derived from analysis of semi-structured data.

30. The computer system of claim 19 wherein semi-structured data is converted to structured data using the mapping.

31. The computer system of claim 19 where the mapping includes for each parent and child relationship in the semi-structured data, a mapping from a parent identifier and a child identifier of the parent and child relationship to a table identifier of a table in the structured data that corresponds to the parent and child relationship.

32. The computer system of claim 31 wherein each mapping further includes a parent key identifier and a child key identifier of the table that correspond to the parent identifier and child identifier of the mapping.

33. The computer system of claim 31 wherein the provided mapping includes for each child of a parent and child relationship that is also not a parent, a mapping from the child identifier of that child to a table identifier of a table in the structured data.

34. The computer system of claim 33 wherein the mapping from the child identifier of that child also maps to a child key identifier in the table.

35. The computer system of claim 19 wherein the mapping supports recursive definition of elements of the semi-structured data.

* * * * *

UNITED STATES PATENT AND TRADEMARK OFFICE
CERTIFICATE OF CORRECTION

PATENT NO.     : 6,449,620 B1
DATED          : September 10, 2002
INVENTOR(S)    : Draper et al.

It is certified that error appears in the above-identified patent and that said Letters Patent is hereby corrected as shown below:

Column 1,
Line 45, delete the comma between "and" and "so";

Column 7,
Line 45, delete colon between "a" and "structured";

Column 10,
Line 40, "where" should be -- wherein --;

Signed and Sealed this

Twenty-eighth Day of January, 2003

JAMES E. ROGAN
*Director of the United States Patent and Trademark Office*